US009363939B2

(12) United States Patent
Henry

(10) Patent No.: US 9,363,939 B2
(45) Date of Patent: Jun. 14, 2016

(54) APPARATUS AND METHOD FOR AIR REMOVAL IN TILLAGE IMPLEMENTS USING THREE WAY VALVES

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 32 days.

(21) Appl. No.: 14/560,492

(22) Filed: Dec. 4, 2014

(65) Prior Publication Data

US 2015/0156949 A1 Jun. 11, 2015

Related U.S. Application Data

(60) Provisional application No. 61/914,678, filed on Dec. 11, 2013.

(51) Int. Cl.
*A01B 63/22* (2006.01)
*A01B 21/08* (2006.01)

(52) U.S. Cl.
CPC .............. *A01B 63/22* (2013.01); *A01B 21/083* (2013.01)

(58) Field of Classification Search
CPC ........... A01B 5/04; A01B 63/10; A01B 63/22
USPC .............................................. 172/1, 663, 452
See application file for complete search history.

(56) References Cited

U.S. PATENT DOCUMENTS

| 3,910,353 | A | * | 10/1975 | Ralston ................ A01B 69/006 172/1 |
| 4,337,832 | A | * | 7/1982 | Whitlow ................ B62D 7/142 172/265 |
| 4,506,898 | A | | 3/1985 | Herron |
| 4,585,172 | A | * | 4/1986 | Gazzera .................. F15B 11/22 239/265.33 |
| 4,721,168 | A | * | 1/1988 | Kinzenbaw .......... A01B 73/005 111/57 |
| 4,913,070 | A | | 4/1990 | Morrison, Jr. |
| 5,427,182 | A | | 6/1995 | Winter |
| 5,484,025 | A | | 1/1996 | Landphair et al. |
| 5,489,113 | A | | 2/1996 | Torborg |
| 5,562,165 | A | | 10/1996 | Janelle et al. |
| 6,000,315 | A | | 12/1999 | Graham et al. |
| 6,085,846 | A | * | 7/2000 | Buchl .................. A01B 63/114 172/4 |
| 6,129,157 | A | | 10/2000 | Noonan et al. |
| 6,164,385 | A | | 12/2000 | Buchl |
| 6,216,794 | B1 | * | 4/2001 | Buchl .................... A01B 63/00 111/903 |
| 6,698,523 | B2 | | 3/2004 | Barber |

(Continued)

FOREIGN PATENT DOCUMENTS

WO 2004/084616 A1 10/2004

*Primary Examiner* — Gary Hartmann
(74) *Attorney, Agent, or Firm* — Rebecca L. Henkel

(57) ABSTRACT

Air is removed from an hydraulic system for an agricultural implement supporting a plurality of gangs of disk blades extending generally laterally relative to a forward travel direction. The implement has carrier frames pivotally connected to wheel assemblies for controlling the height of the carrier frames relative to the ground through hydraulic actuators acting on the wheel assemblies. The hydraulic control unit enables independent and individual control of each actuator. An electronic control unit (ECU) controls three way valves associated with each actuator so that they may be operated in unison or individually. Hydraulic fluid is passed through the most remote actuator first and then actuators closer to the hydraulic control unit to remove air.

17 Claims, 6 Drawing Sheets

(56) References Cited

U.S. PATENT DOCUMENTS 6,810,968 B2 11/2004 Myers
7,596,935 B2 * 10/2009 Bollinger ............ A01D 34/661
  56/14.9
7,726,050 B2 6/2010 Itou
8,408,326 B2 4/2013 Yuen et al.
8,413,738 B2 4/2013 Van Der Lelij

* cited by examiner

APPARATUS AND METHOD FOR AIR REMOVAL IN TILLAGE IMPLEMENTS USING THREE WAY VALVES

CROSS REFERENCE TO RELATED APPLICATIONS

This is a non-provisional application based upon U.S. provisional patent application Ser. No. 61/914,678, entitled "APPARATUS AND METHOD FOR AIR REMOVAL IN TILLAGE IMPLEMENTS USING THREE WAY VALVES", filed Dec. 11, 2013, which is incorporated herein by reference.

BACKGROUND OF THE INVENTION

1. Field of the Invention

The present invention relates to farm implements, and, more particularly, to systems and methods for maintaining such implements level relative to the soil.

2. Description of the Related Art

In the continuing quest for providing greater efficiency in the operation of farm implements, machines have been constructed to have ever increasing lateral spans relative to a tractor or central unit propelling the unit over a field. When the span increases to realize greater efficiency and speed, the criteria of having a uniform and level tool contact with the soil becomes extremely critical. Equipment with significant lateral spans have many different joints and are usually articulated to enable transport to and between fields.

An area of special importance to level positioning of farm implements is found in the tillage field. The desirable outcome is a uniform physical depth of the tillage and a uniform entry of the disk blades or harrows into the soil. The need to have a level positioning of the implement is made more challenging with the use of hydraulic actuators which control the depth of penetration of the disk blades or other tools. In current practice, hydraulic actuators are connected in series and it is possible through normal operation for hydraulic fluid leakage to make the actuators out of sync with one another. In addition, field conditions, such as wheel loading and other variables, require an adjustment to the synchronization of the different sections of the tillage implement, thereby requiring the operator to dismount from a tractor and make manual adjustments.

It is current practice to partially counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished.

It has been proposed in co-pending application entitled "Remote Leveling of Tillage Implements Using Three-Way Valves", of common assignment with the present invention to automatically adjust the hydraulic actuators in a system for leveling tillage implements by using three-way valves to enable a single hydraulic control for individual adjustment and to connect the actuators in series for common movement during field operation. This system provides the benefits of individual actuator adjustment while enabling a minimum length to hydraulic lines extending from a hydraulic control unit to the individual actuators. With such a system however, it is possible to entrain air in the additional connections between the three-way valves so as to take away from the objective that adjustment and operation takes place without any air in the system.

What is needed in the art therefore, is an effective apparatus and method for air removal in agricultural implements of the above type.

SUMMARY OF THE INVENTION

An advantage of the present invention is a more effective air removal in systems that synchronize multiple sections of a farm tillage implement.

In one form, the invention is an agricultural implement spanning a lateral distance relative to a forward direction, the implement including a plurality of carrier frames, each for supporting a plurality of soil engaging tools. At least one supporting element is carried by each carrier frame for variably positioning the carrier frame relative to the soil. A hydraulic actuator has a housing, in which a piston is displaceable and an output shaft connected thereto variably extending from the actuator housing and connected between each supporting element and respective carrier frame for varying the position of the respective carrier frame relative to the soil, each piston having a land to permit flow past the piston when the actuator output shaft is fully extended. A sensor determines the displacement of the output shaft relative to the actuator housing of each said actuator. A source of pressurized hydraulic fluid is provided to a hydraulic control unit receiving pressurized fluid and directing pressurized hydraulic fluid to the actuators to move the actuators independently in response to a signal input. An electronic control unit (ECU) establishes a desired input signal and compares it to the signal from each sensor to send a resultant signal to the hydraulic control unit for varying the position of each actuator output shaft to reach the signal input. A pair of hydraulic lines extend from the hydraulic control unit for connection with the actuators. Valves are controllable by the ECU for individually selectively bypassing or connecting each actuator to the hydraulic control unit, whereby the actuators may be controlled individually or in unison, the valves being connected by a common line. The ECU is controllable to fully extend the output shaft of one of the actuators and block other actuators from the hydraulic system while flowing hydraulic fluid through the valve common line and the one actuator past the land therein to remove air, the ECU being controllable to subsequently also extend the next actuator fully and flow hydraulic fluid through the next actuator and common line to remove air from the next actuator and, when air is removed from all subsequent actuators and common lines connecting the valves to provide a series connection therebetween.

In another form, the invention is a method of air removal for an agricultural implement including a plurality of articulated carrier frames, each for supporting a plurality of soil engaging tools and having at least one supporting element carried by the carrier frame for variably positioning the carrier frame relative to the soil. Hydraulic actuators are provided for each carrier frame with each actuator having a housing in which a piston is displaceable and output shaft connected thereto variably extending from the actuator housing and connected between the supporting elements and the carrier frame for setting the position of the carrier frame relative to the soil. A hydraulic control system applies pressurized hydraulic fluid to both sides of each piston with the pistons having a land so that when the output shaft is fully extended the piston permits hydraulic flow past the piston. Valves are associated with each actuator to permit flow through the actuators either in series or locking the valves from the system with the valves being connected to one another by a common line and one of the valves being closest to the hydraulic control unit. The method includes the steps of fully extending the output shaft of one of the actuators and locking other actuators from the hydraulic system. Thereafter, hydraulic fluid is passed through the valve common line and the one actuator to remove air therein. Subsequently, the adjacent actuator to the one actuator is extended fully and hydraulic fluid flows through the next actuator and the common line to remove therein. Subsequently, when air is removed from all subsequent actuators and common lines, the valves are set to connect the actuators in series for movement in unison.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplifications is not to be construed as limiting the scope of the invention in any manner.

DETAILED DESCRIPTION OF THE INVENTION

Figure 1:
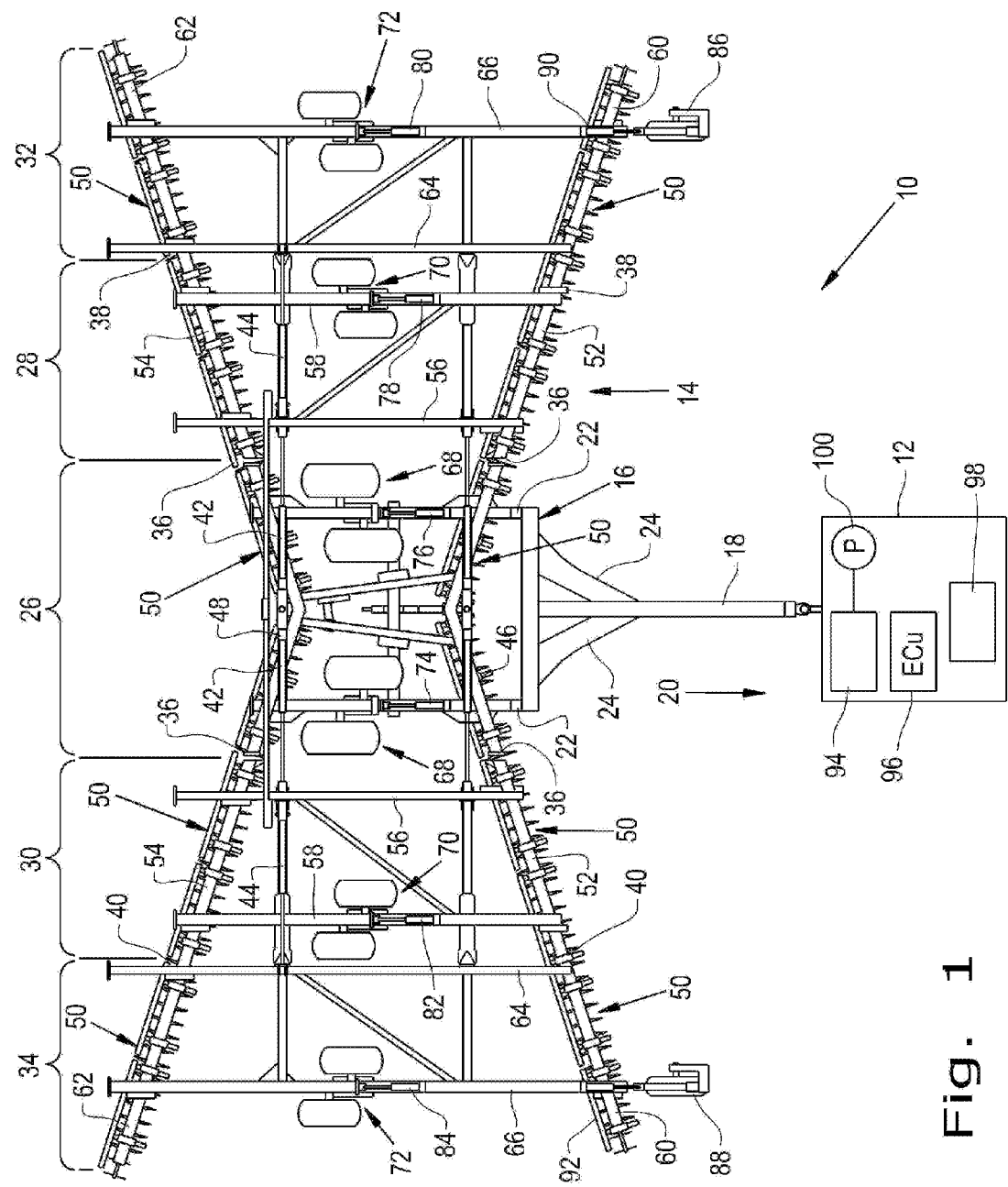
FIG. 1 illustrates a tillage implement including a support of disk blades embodying the present invention, being pulled by a tractor shown in schematic fashion.

Referring now to the drawings, and more particularly to FIG. 1, there is shown a tillage apparatus 10 which generally includes a tractor 12 shown schematically and an agricultural tillage implement 14 for tilling the soil prior to seeding. It should be noted that many different tools may be employed with the tillage implement 14 beyond the embodiment shown.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

The tillage implement 14 has a center section 26, an inner right wing section 28 and an outer right wing section 32 as viewed in FIG. 1. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted, the frame elements 46 and 48 extend generally laterally with respect to the direction of movement 20 of the agricultural implement. Frame members 46 and 48, however, extend at an angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

The various sections 26, 28, 30, 32 and 34 of the tillage implement 14 are positioned at variable positions relative to the soil and thus set the position of the gangs of disk harrows 50 above the soil and the depth they cut into the soil. As illustrated, the variable support elements are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to support and variably position inner wing sections 28 and 30 relative to the soil. In addition, wheel sets 72 are pivotally mounted on frame members 66 to support and variably position outer wing sections 32 and 34 at a variable distance relative to the soil. Actuators 74 and 76 manipulate wheel sets 68 to establish the distance of center section 26 relative to the soil. Actuators 78 and 80 support and variably position sections 28 and 32 relative to the soil. Finally, actuator assemblies 82 and 84 support and variably position sections 30 and 34 relative to the soil.

In addition, castor wheel assemblies 86 on section 32 and 88 on section 34 orient the for and aft angle of the tillage implement 14 relative to the soil. Actuators 90 and 92 are employed for this purpose.

The actuators described above are shown as hydraulic and for this purpose a hydraulic control unit 94 is mounted in the tractor 12 and has a pump 100 for pressurizing hydraulic fluid to control the actuators. The hydraulic control unit 94 receives inputs from an electronic control unit (ECU) 96 which receives various inputs set out below, in addition to an operator input through control unit 98.

Figure 2:
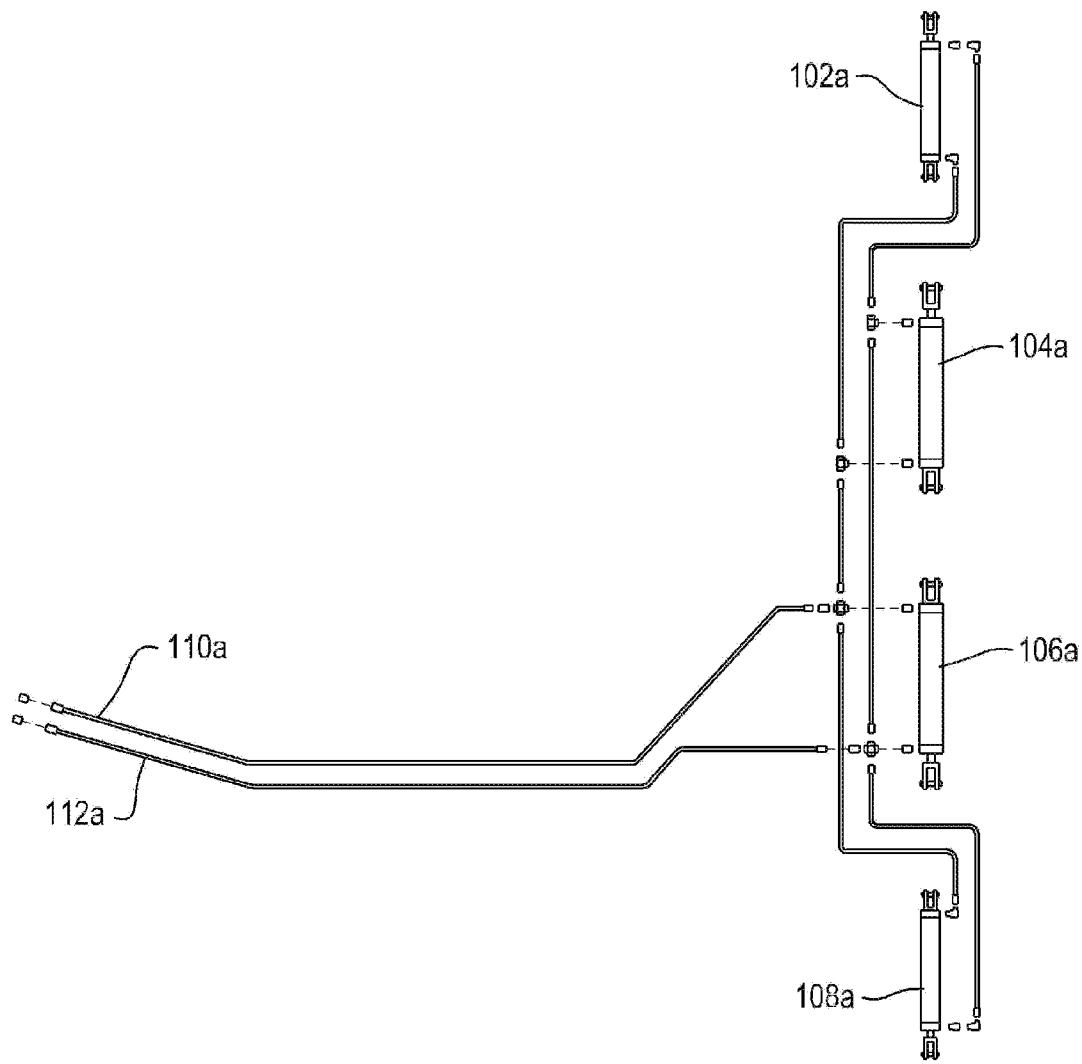
FIG. 2 is a plan view of a hydraulic system shown in the prior art for the tillage implement of FIG. 1.

The hydraulic interconnection established by a typical prior art system for elevating the various sections of the tillage implement 14 is shown in FIG. 2. In this arrangement, each of a set of actuators 102a, 104a, 106a and 108a is connected to a hydraulic control pressure by supply conduits 110a and 112a. As is illustrated in FIG. 1 the actuators 102a-108a are connected in parallel so that the pressure uniformly applies to each actuator in the set. As described above however, the actuators may become out of sync due to linkage past a piston thus requiring additional steps in the field to ensure synchronization of the actuators.

Figure 3:
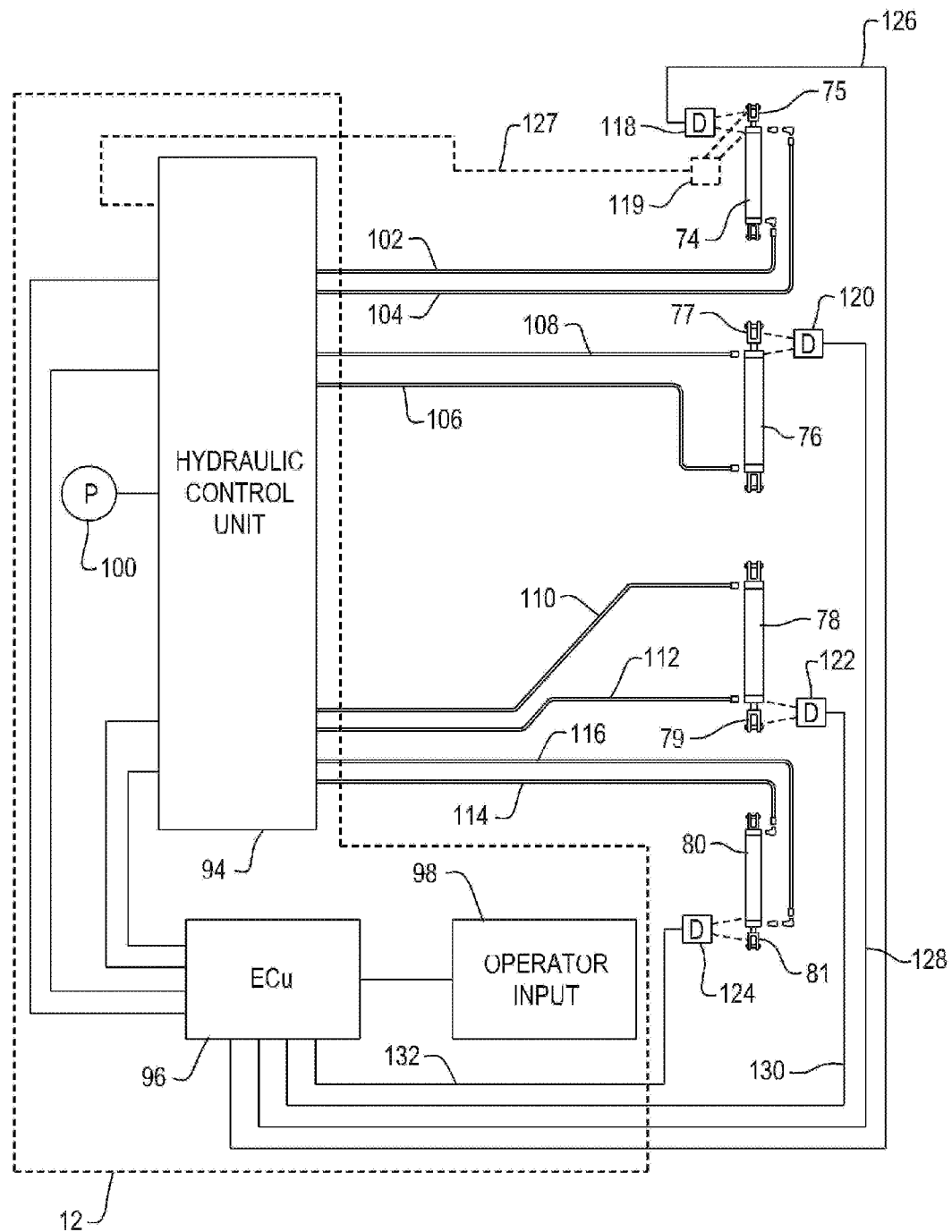
FIG. 3 is a plan view of a hydraulic system for the tillage implement of FIG. 1.

In accordance with the present invention, a control system and method set forth in FIG. 3 overcomes these difficulties. FIG. 3 shows actuators 74, 76, 78 and 80. The operation of the additional actuators is similar and is omitted to enable a better understanding of the present invention. Each of the actuators 74, 76, 78 and 80 has an output shaft 75, 77, 79 and 81, respectively extending from the actuator body. Each actuator has a piston displaceable within a chamber in the actuator body and connected to the respective output shaft.

The piston end of the actuator 74 is connected to the hydraulic control unit 94 by a hydraulic line 102. The output shaft end of actuator 74 is connected to the hydraulic control unit 94 by a return line 104. In similar fashion, the piston end of actuator 76 is connected by line 106 and a return line 108 is provided to control unit 94. The piston end of actuator 78 is connected to hydraulic control unit 94 by line 110 and the return line is designated as 112. Finally, the piston end of actuator 80 is connected to hydraulic control unit 94 via hydraulic line 114 and a return line 116 is provided. The independent connection of the actuators to the hydraulic control unit 94 will enable independent establishment of the height of the units relative to the soil.

The relative physical position of the hydraulic control unit 94 may be different than the one shown in FIG. 3, depending upon the application for the unit. It may be a single module or may be provided in individual control sections. However the hydraulic control unit 94 is positioned relative to the actuators, it permits independent manipulation of the actuator output shafts as will be described below. As illustrated, the dashed line 94 around the valves shows them as part of the hydraulic control unit.

For this purpose, a displacement detecting device is provided to provide a signal proportional to the displacement of each output shaft relative to the body of the respective actuator. In addition to the displacement signal, a signal reflecting the rate of change of displacement or $\Delta D/\Delta T$ is provided. The displacement indicating devices are identified as 118 for actuators 74, 120 for actuators 76, 122 for actuator 78 and 124 for actuator 80. The displacement indicating devices 118, 120, 122 and 124 provide signal inputs to the ECU via lines 126, 128, 130 and 132, respectively. The displacement indicating devices are devices that provide appropriate control signals that are proportional to the displacement of the output shaft relative to the various actuators and preferably the rate of change of displacement. The interconnections with the output shafts and actuators are not included to enable a better focus on the basic principle of the invention. Any one of a number of sensors may be employed for this purpose.

As shown, the displacement sensors and $\Delta D/\Delta T$ sensors are incorporated into a single unit. However, the $\Delta D/\Delta T$ signal may be provided in a separate unit 119 shown in dashed lines for actuator 74. Unit 119 may be connected to ECU 96 by a line 127, also shown as a dashed line. Similar units would be provided for actuators 76, 78, and 80 if it is desired to use separate units for displacement and $\Delta D/\Delta T$ signals.

The invention is applied to the tillage implement of FIG. 1 by initially setting the implement on a level surface for calibration. The implement 14 is raised to the maximum extent where each individual actuator has its output shaft at its maximum length. At this point, a bypass port in the piston provides a bypass for return flow back to the actuator control unit 94. This ensures that any air entrained in the system due to assembly or other reason is passed to the hydraulic system. The implement 14 is then lowered so that the tools, in this case the gangs of disk blades 50, just touch the level surface. Preferably this surface would be a level concrete surface. Once the actuators are adjusted to reach this point, individual readings of the displacement between the actuator rod and the actuator body are taken with full hydraulic fluid in the chambers. The displacement signals of the individual actuators are stored in the ECU 96. The resultant individual actuator displacement signals are considered the synchronized set point for the signals. It should be apparent to those skilled in the art that the use of placing the tools at the plane of the soil is but one of a number of reference points that define a unitary plane used in defining the reference plane.

The tillage implement is then in a position to have each of the actuators raise and lower the individual frame elements in unison to provide a uniform height above the ground and a uniform depth when the gangs of disk blades 50 are positioned in the soil. Periodically during the operation of the tillage implement, the readings of the individual actuators are determined and, if they deviate from the set point initially established, the hydraulic control system provides appropriate hydraulic fluid to achieve the same set point. This is done independently of the other actuators so that correction is applied individually to each actuator unit. The tillage implement 14 is then able to provide accurate depth of penetration among the gangs of disk harrows 50.

The implement may be adjusted additionally in the field. In this procedure, the operator prepares a test run into the soil in a field and then measures the depth of the penetration of the disk blades. To the extent that it is necessary to make a minor adjustment, the individual cylinder that is out of sync with the remaining cylinders is adjusted and a new set point is established as the level uniform plane. This ensures that field conditions such as wheel loading and other factors have a minimal and easily correctable impact on the tillage operation.

In addition, the actuators are corrected for the differential rate of displacement change by the $\Delta D/\Delta T$ so that the entry of the gangs of disk blades 50 is uniform at the beginning of the field and the withdrawal is uniform at the end of the field. The process of recalibration may be made automatic so that it does not interfere with the immediate operator directed tillage over a field and preparing the soil.

Figure 4:
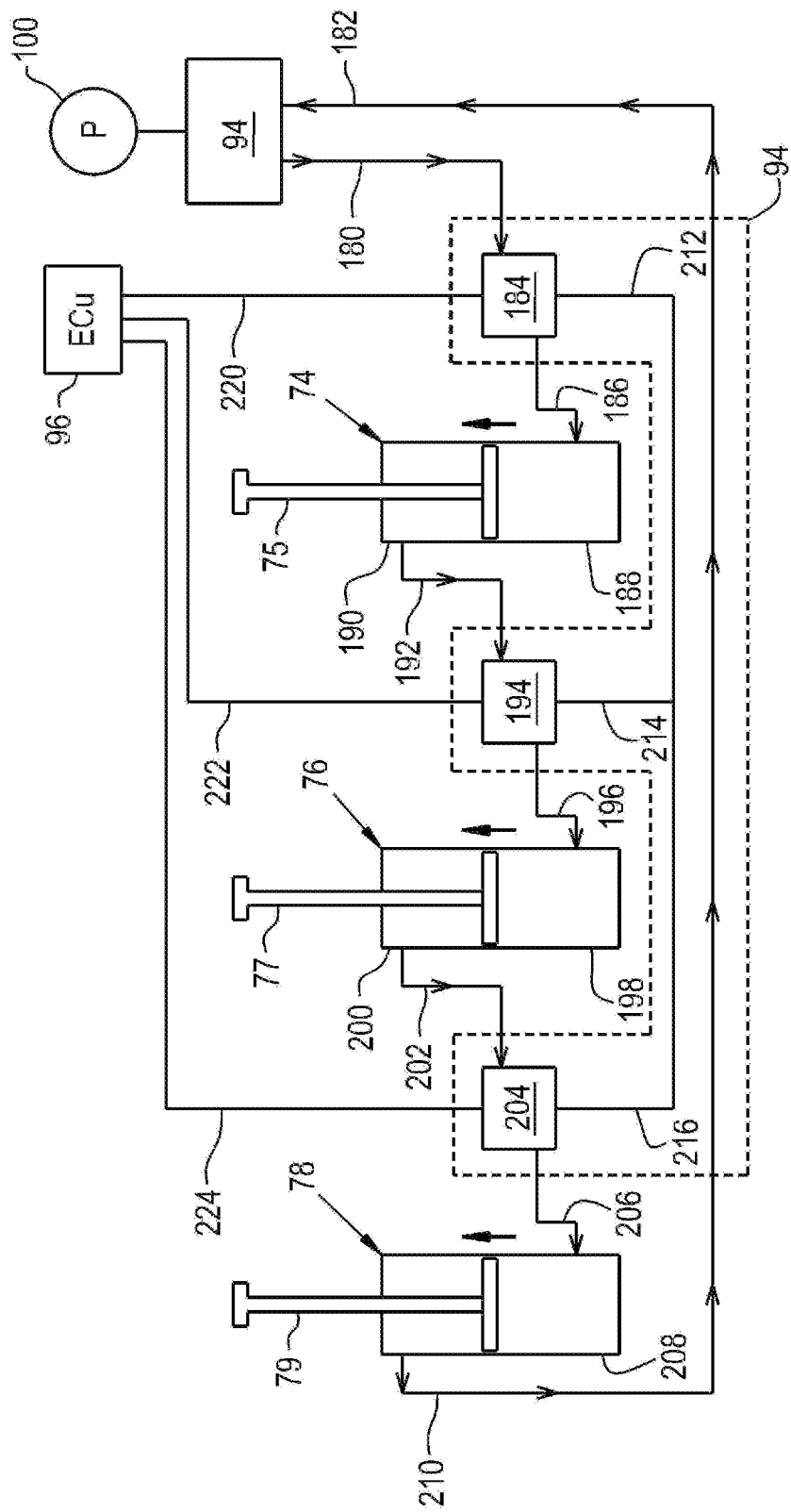
FIG. 4 is a plan view of a preferred hydraulic system for the tillage implement of FIG. 1 in a first state; and, FIGS. 5 and 6 show the hydraulic system of FIG. 4 in different states.
Figure 5:
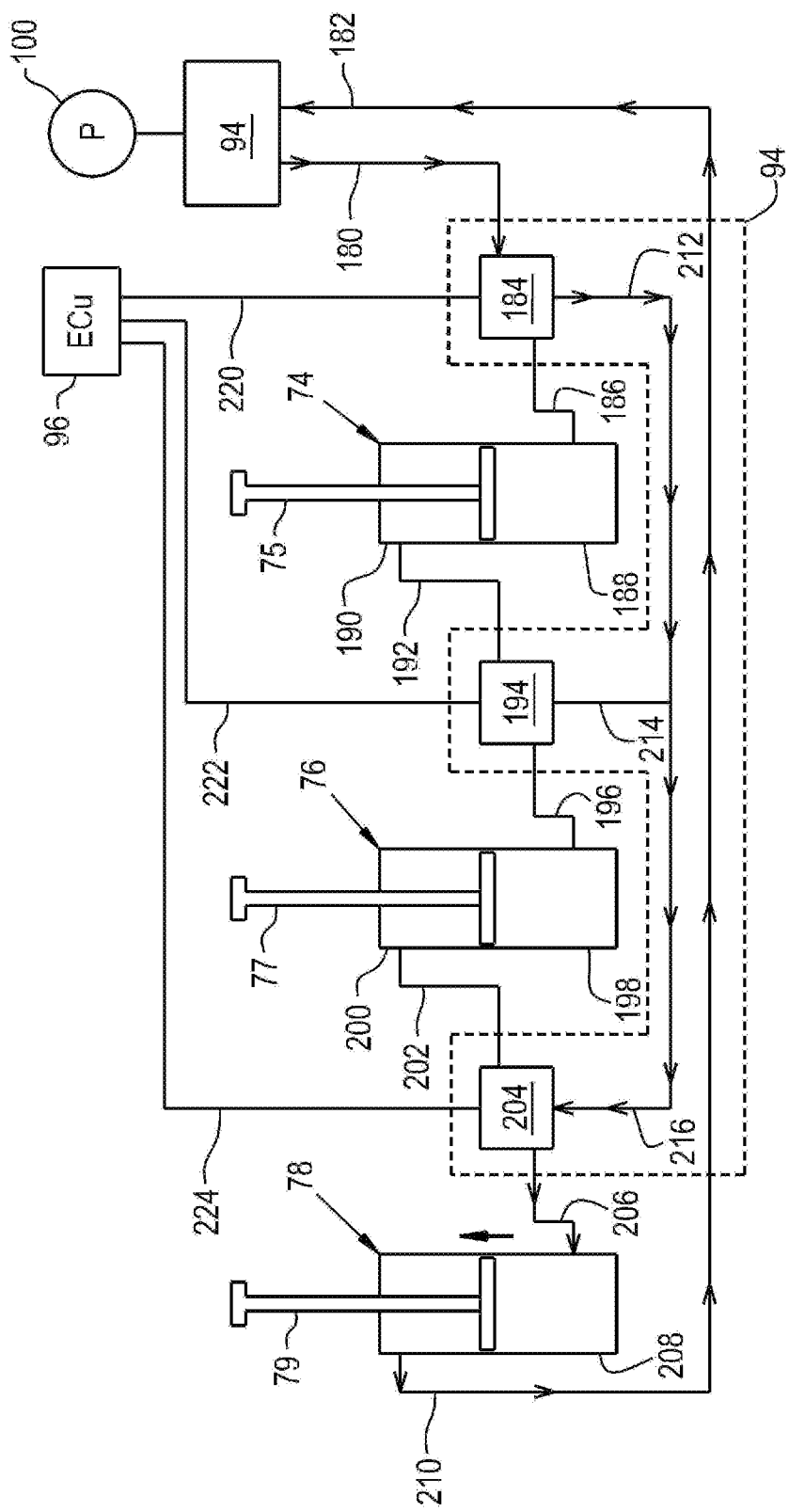
Figure 6:
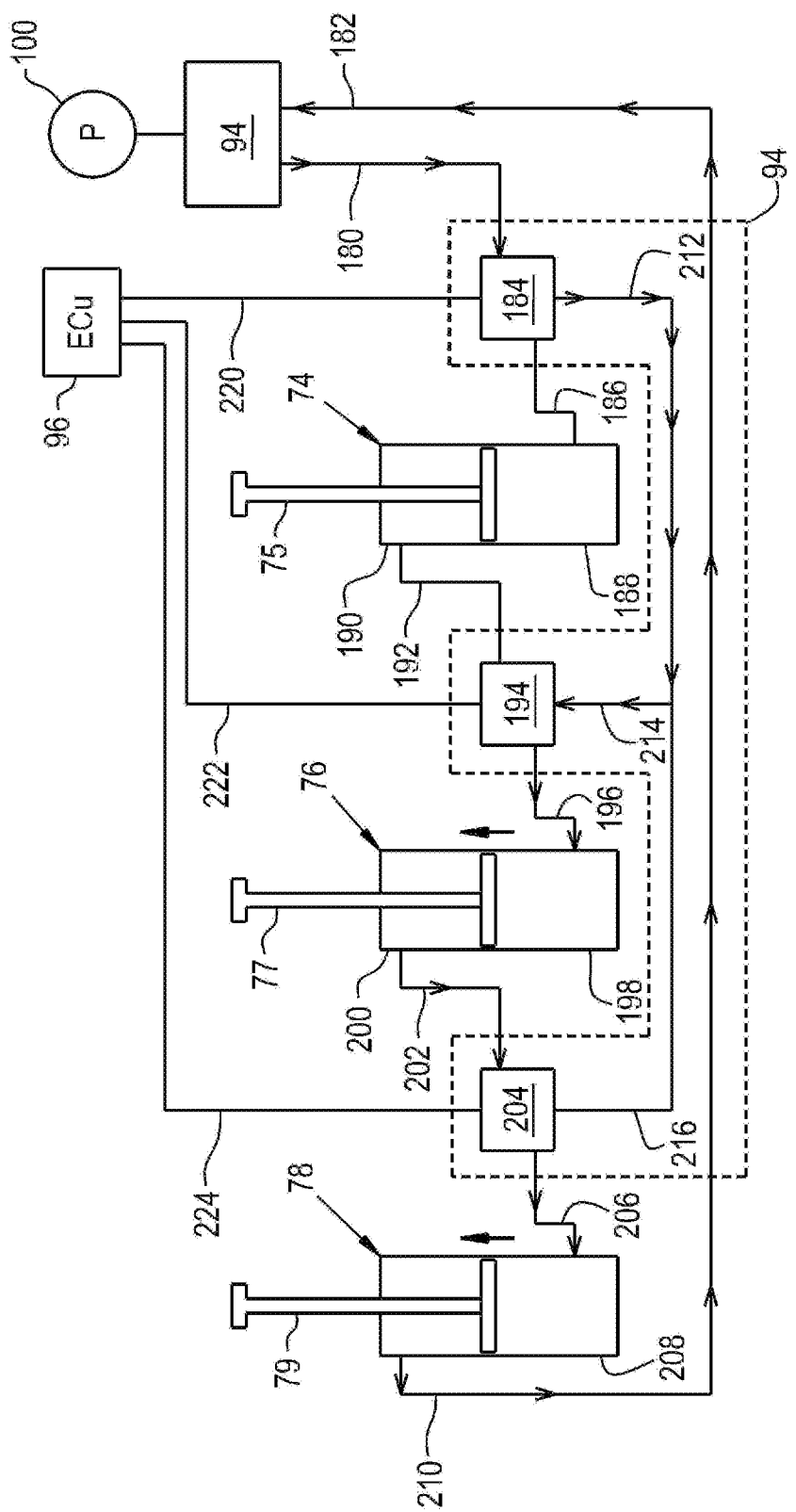

The hydraulic system illustrated in FIGS. 4-6 illustrates a preferred hydraulic system for the tillage implement of FIG. 1. The system shown in FIGS. 4-6 is described by specifically referring to FIG. 4. In that figure the pump for pressurizing the hydraulic fluid is designated as 100, but the hydraulic control unit 94 schematically shown in FIG. 3 is distributed among the actuators as will be explained below. The system will be explained by using actuators 74, 76 and 78. The additional actuator or actuators are omitted from the description to enable a clearer understating of the invention. In this system there is a pressure line 180 connected to the output of hydraulic control unit 94 and a second pressure line 182 also connected to the hydraulic unit 94. The pressure line 180 goes to a first three-way valve 184 and line 186 which is connected to the piston end 188 of actuator 74. The output shaft end 190 has a line 192 leading to an additional three-way valve 194.

From there a line 196 extends to the piston end 198 of actuator 76. The output shaft end 200 has a line 202 extending to a third three-way valve 204. Finally a line 206 extends to the piston end 208 of actuator 78. A line 210 connects with line 182 leading to the hydraulic control unit. Bypass line 212 leads from three-way valve 184 and has a connecting line 214 to valve 194 and a connecting line 216 to three-way valve 204.

The three-way valves are each set up so that when they are de-energized there is flow from the respective pressure line to flow from the supply line is connected to the respective piston end of the associated actuator. In other words when valves 184, 194 and 204 are de-energized the flow is from line 180 to 186, 192 to 196, and 202 to 206, respectively. When each solenoid valve or three-way valve is energized, there is flow between the supply and the bypass line. In other words, when valve 184 is energized, flow to 186 is blocked and flow is directed from line 180 to line 212. Correspondingly, when valve 194 is energized the flow is from line 192 to line 214 with the flow to 196 blocked. Finally, when valve 204 is energized, the flow is from line 202 to line 216 with the line 216 blocked. The valves 184, 194 and 204 are controlled by the ECU 96 through their interconnecting lines.

The sensors 118, 120 and 122 are employed to measure the actual displacement of output shaft 75, 77 and 79 but are not shown in these figures to aid in the understanding of the invention.

The arrangement set forth above enables a traditional series connection between the actuators but with the possibility to minimize the number of hydraulic lines deployed on the carrier frame but still retain the ability to provide individual adjustment. The manner of adjustment of the actuators is fully described in co-pending application entitled "Remote Leveling of Tillage Implements Using Three-Way Valve" which is of common assignment with the present invention and which is hereby incorporated in its entirety. This permits actuators to be adjusted individually but still enables a hydraulic system with common lines extending from a hydraulic control unit to the actuators.

Before the actuators are able to be adjusted, the air must be expelled from the hydraulic lines. Unlike the traditional series actuator hookup, the system described above has a common line 212 and inter connecting lines 214 and 216 to the valves which have the possibility of entrained air. In accordance with the present invention, the method illustrated in FIGS. 4-6 enables an efficient and effective way of removing entrained air.

Referring first to FIG. 4, the valves 184, 194 and 204 are set so that flow is through the actuators 74, 76 and 78 in series so that they act in unison. The method for removing air from the system is illustrated in FIG. 5 in which the valves 184 and 194 lock out actuators 74 and 76 respectively, so that flow is to the common line 212 and through line 216 to the piston end of actuator 78. In this position, valve 184 is set so that hydraulic flow is from line 180-212 and flow through actuator 76 is blocked so that flow is between line 216 through valve 204 through line 206 to the piston end of actuator 78. The output shaft 79 is fully extended so that a land in its associated piston (not shown) permits flow through conduit 210 to line 182. This insures that any air entrained within the line 212 and 216 is passed back to the hydraulic system.

Once the air has been removed from this section, the valves are placed in the position shown in FIG. 6. The valve 204 is furthest from the hydraulic control unit 94 and the valve 194 is adjacent to it with the valve 184 being closest to the hydraulic control unit 94. The procedure for removing air is shown with three valves. It should be apparent however that a greater number of valves may have air removed using the same procedure by working from the farthest actuator toward the closest actuator.

In the condition shown in FIG. 6, the actuator 74 continues to be locked out of the system whereas the actuator 76 is connected to the system by energizing valve 194 to permit flow from line 214 through 196 and into the piston end of actuator 76. In this case, the actuator 76 is extended fully so that a land on its piston (also not shown) permits flow out of the cylinder and through line 202 to valve 204 where it passes through line 206 and through actuator 78 for discharge past the land in the piston of actuator 78 to line 210 connecting to the line 182.

Once this is completed, the valves 184, 194 and 204 are set to connect the actuators 74, 76 and 78 in series so as to permit the actuators to operate in unison. The method described allows an effective and efficient way of removing air from a system having three-way valves to permit a minimum number of hydraulic lines.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural implement spanning a lateral distance relative to a forward direction, said implement comprising:
   a plurality of carrier frames, each for supporting a plurality of soil engaging tools;
   at least one supporting element carried by each carrier frame for variably positioning the carrier frame relative to the soil;
   an hydraulic actuator having a housing, in which a piston is displaceable and an output shaft connected thereto variably extending from said actuator housing and connected between said each supporting element and said respective carrier frame for varying the position of said respective carrier frame relative to the soil, said piston having a land to permit flow past the piston when the actuator output shaft is fully extended;
   a sensor determining the displacement of the output shaft relative to the actuator housing of each said actuator;
   a source of pressurized hydraulic fluid;
   an hydraulic control unit receiving said pressurized fluid and directing pressurized hydraulic fluid to said actuators to move said actuators independently in response to a signal input;
   an electronic control unit (ECU) establishing a desired input signal and comparing it to the signal from each said sensor to send a resultant signal to said hydraulic control unit for varying the position of each actuator output shaft to reach the signal input a pair of hydraulic lines extending from said hydraulic control unit for connection with said actuators; and
   valves controllable by said ECU for individually selectively one of bypassing and connecting each actuator to said hydraulic control unit, whereby said actuators may be controlled individually or in unison, said valves being connected by a common line, said ECU being controllable to fully extend the output shaft of one of the actuators and block other actuators from the hydraulic system while flowing hydraulic fluid through the valve common line and said one actuator past the land to therein to remove air, said ECU being controllable to subsequently also extend the next actuator fully and flowing through the next actuator and common line to remove air from said next actuator and, when air is removed from all subsequent actuators and common lines connecting the valves to provide a series connection therebetween.

2. The agricultural implement of claim 1, wherein said one actuator is the furthest actuator from the hydraulic control unit.

3. The agricultural implement of claim 1, wherein each actuator has a piston end and a shaft end and said valves each have a first connection to the piston end of the adjacent valve.

4. The agricultural implement of claim 3, wherein the first of a plurality of valves has a second connection receiving an input from said hydraulic control unit and subsequent valves have a second connection from the output shaft end of the adjacent valve.

5. The agricultural implement of claim 4, wherein each of said valves have a third connection to said common line fluidly connecting them.

6. The agricultural implement of claim 5, wherein each valve has a fluid connection between the first and second connection when in the de-energized state and a fluid connection between connections 2 and 3 in the energized state, thereby enabling the valves to be connected or disconnected from the hydraulic circuit to said hydraulic control unit.

7. The agricultural implement of claim 1, wherein the valves in a de-energized state permit flow through said adjacent actuator and in an energized state blocks flow through said adjacent actuator.

8. The agricultural implement of claim 1, in which the variable positioning components are wheel assemblies pivotally connected to said carrier frames for varying the distance of said carrier frames relative to the soil.

9. The agricultural implement of claim 1, in which there is a pivotal connection between the plurality of carrier frames.

10. The agricultural implement of claim 9, having a center section with a pair of wheels supporting said carrier frame and at least one pair of outer carrier frames each being supported by a wheel assembly.

11. The agricultural implement of claim 1, in which the tools are gangs of disk blades for tilling the soil.

12. A method of leveling an agricultural implement relative to the soil, said agricultural implement including a plurality of articulated carrier frames, each for supporting a plurality of soil engaging tools, at least one supporting element carried by the carrier frame for variably positioning the carrier frame relative to the soil and an hydraulic actuator for each supporting element, the hydraulic actuator having a housing in which a piston is displaceable and an output shaft connected thereto variably extending from said actuator housing and connected between the supporting elements and the carrier frame for setting the position of the carrier frame relative to the soil, and an hydraulic control system for applying pressurized hydraulic fluid to both sides of each piston, said pistons having a land so that when the output shaft is fully extended the land in the piston permits hydraulic flow past the piston and between the two hydraulic lines, and a valve associated with each actuator to permit flow through the actuators in series or selectively bypassing the valves, the valves being connected by a common line, the method comprising the steps of:

fully extending the output shaft of one of the actuators;

blocking other actuators from the hydraulic system;

flowing hydraulic fluid through the valve common line and said one actuator past the land to therein to remove air;

subsequently also extending the next actuator fully and flowing through the next actuator and common line to remove air from said next actuator; and when air is removed from all subsequent actuators and common lines connecting the valves to provide a series connection therebetween.

13. The method of claim 12, in which said one actuator is the furthest actuator from the hydraulic control unit.

14. The method of claim 12, in which the agricultural implement has a center section and at least a pair of carrier frames pivotally connected to the center section.

15. The method of claim 14, in which the variable positioning of the carrier frames is through wheel assemblies pivotally connected to said carrier frame and acted on by said actuators to variably position the carrier frames.

16. The method of claim 12 in which an electronic control unit (ECU) controls the solenoid valves.

17. The method of claim 16 in which the ECU controls the hydraulic control unit.

* * * * *